2,906,737

ESTERIFICATION OF TEREPHTHALIC ACID IN THE PRESENCE OF TITANIUM DIOXIDE AS CATALYST

Owen York, Jr., Wilmington, Del., assignor to Hercules Powder Company, Wilmington, Del., a corporation of Delaware No Drawing. Application February 29, 1956
Serial No. 568,426

3 Claims. (Cl. 260—75)

This invention relates to a process for the production of esters of terephthalic acid from which synthetic film- and fiber-forming synthetic linear polyesters can be produced.

It is well known that monomeric glycol terephthalates can be produced by reacting a glycol of the formula:

$$HO(CH_2)_nOH$$

where "$n$" is an integer from 2 to 10 inclusive with terephthalic acid or with a dialkyl ester of terephthalic acid. In most commercial operations, the glycol is reacted with a dialkyl ester of terephthalic acid by alcoholysis since this reaction is more easily performed and is more rapid than the direct esterification of terephthalic acid with a glycol. It would, however, be desirable from the economic viewpoint to prepare monomeric glycol terephthalates directly from terephthalic acid since the acid can be produced at a somewhat lower cost than its dialkyl esters.

It is also known that monomeric glycol terephthalates, e.g., bis(2-hydroxyethyl) terephthalate, can be polymerized to produce polyesters suitable for the production of fibers and films. It is also known that titanium dioxide is useful as a catlyst for the production of such polyesters. However, to the extent of my knowledge, titanium dioxide has not been suggested as a catalyst for the direct esterification of terephthalic acid.

In accordance with the present invention, it has been found that terephthalic acid can be esterified with a glycol of the formula:

$$HO(CH_2)_nOH$$

where "$n$" is as defined above, in the presence of titanium dioxide as a catalyst and that the esterification is appreciably faster than when the reaction is carried out in the absence of titanium dioxide.

The invention will hereinafter be specifically described with respect to the preparation of bis(2-hydroxyethyl) terephthalate by the direct esterification of terephthalic acid with ethylene glycol, which constitutes the preferred embodiment of the invention. Those skilled in the art will recognize, however, that the invention is applicable in general to the preparation of other esters of terephthalic acid prepared by esterification with any glycol of the preceding formula.

The following examples are presented for purposes of illustration. Parts and percentages are by weight unless otherwise specified.

Example 1

Into a reaction vessel equipped with a stirrer, thermometer, and reflux condenser with water trap, there was placed 50 parts of terephthalic acid, 300 parts of ethylene glycol, and 0.025 part of titanium dioxide. The titanium dioxide employed was an essentially pure pigment grade of rutile $TiO_2$. This reaction mixture was heated with stirring at atmospheric pressure to a temperature of 195 to 196° C. and the reaction allowed to continue at this temperature with the removal of water as it was formed. The reaction was continued for 11¾ hours, including the heat-up period. The acid number of the product was less than 0.2 and analysis showed it to be essentially a mixture of bis(2-hydroxyethyl) terephthalate and excess glycol. The reflux condenser was then removed and the excess ethylene glycol was removed by distillation.

The ester produced as above was next converted into a high molecular weight polyester by raising the reaction temperature to 275° C. and continuing reaction for one hour at a pressure of 15 mm. and 2½ more hours at a pressure of about 1 mm. A polyester having an intrinsic viscosity of 0.65 was obtained.

Example 2

The process described in Example 1 was carried out under identical conditions with the exception that the amount of titanium dioxide was increased to 0.1 part. The reaction was carried out for a total of 7¾ hours and the acid number of the product was nil.

Example A

This example is included for comparative purposes to show the effect of the omission of titanium dioxide. The process was carried out under conditions identical to Example 1 except that titanium dioxide was omitted. A total reaction time of 13¾ hours was required to reach an acid number of less than 0.2.

The manipulative procedures which can be utilized in this invention are already well known to the art. The esterification reaction can be carried out either batchwise or continuously by any procedure which permits the rapid removal of the water of reaction from the reaction zone. A preferred procedure involves simply the heating together of terephthalic acid and an excess of glycol in the presence of titanium dioxide at a temperature ranging from about 110° C. to about 260° C. after which excess glycol is removed by distillation. The preferred reaction temperature is from about 180 to 220° C. and in the case of the lower boiling glycols, the reaction is conveniently carried out at reflux temperature. The reaction, as expected, follows the general rules of chemistry in that the speed of the reaction is proportional to the reaction temperature. If desired, it is possible to carry out the reaction under pressures either lower or higher than atmospheric but in general this is not necessary and merely adds to the cost of operation.

In general, the amount of titanium dioxide which is employed in the reaction can vary widely, e.g., from about 0.01% up to 5%, based on the weight of terephthalic acid. However, it is preferred to employ titanium dioxide in an amount of less than 0.2%, based on the weight of terephthalic acid, because amounts of titanium dioxide up to 0.2% can be tolerated in the monomeric glycol terephthalate. Stated differently, if the amount of titanium dioxide does not exceed 0.2%, it is not necessary to remove the titanium dioxide from the finished product; the monomeric glycol terephthalate can be polymerized in conventional manner and the properties of the resultant polyester will not be harmed by the titanium dioxide. On the other hand, if the amount of titanium dioxide substantially exceeds 0.2%, it is desirable to remove the titanium dioxide, e.g., by filtration, prior to polymerizing the resultant monomer. With the above considerations in mind, the preferred amount of titanium dioxide is from about 0.01% to 0.2%, based on the weight of terephthalic acid.

The titanium dioxide can be incorporated or blended into the initial reaction mixture by any suitable expedient. Preferably, the titanium dioxide is employed in a finely-divided or powdered form and is dispersed directly into the reaction mixture. Alternatively, the titanium dioxide can conveniently be dispersed in the glycol which in turn may be admixed with the terephthalic acid.

The examples have illustrated the esterification of terephthalic acid and ethylene glycol. Other alkanediols having up to 10 carbon atoms can be employed and a similar increase in the rate of reaction attributable to the presence of titanium dioxide will be observed. Representative glycols that are useful are trimethylene glycol, butanediol-1,4, and decanediol-1,10.

It will be apparent from the foregoing description that the present invention provides a catalytic process of high efficiency and enables the rapid and economic production of esters of terephthalic acid. A particular advantage of the invention is that the esterification reaction can be carried to completion at atmospheric pressure in a reasonable time. A further advantage of the invention is that titanium dioxide is readily obtainable in finely-divided form and that its use is free from health hazards attendant the use of a number of other catalytic materials previously proposed for the same type of reaction. Furthermore, the use of titanium dioxide in the prescribed manner leads to the production of esters of excellent color.

A still further advantage of the invention is that titanium dioxide can also act as a catalyst for ester interchange so that the monomeric esters can be polymerized directly into high molecular weight polyesters by further heating, preferably with the application of vacuum, without the addition of another catalyst. If desired, the esterification and polymerization can be carried out concurrently.

What I claim and desire to protect by Letters Patent is:
1. In the esterification of terephthalic acid with a glycol of the formula:

$$HO(CH_2)_nOH$$

where "$n$" is an integer of from 2 to 10 inclusive, the improvement which comprises conducting the esterification in the presence of from about 0.01 to about 5% rutile titanium dioxide as a catalyst.

2. In the esterification of terephthalic acid with ethylene glycol, the improvement which comprises conducting the esterification in the presence of from about 0.01 to about 5% rutile titanium dioxide as a catalyst.

3. A process for the production of high molecular weight polyesters of terephthalic acid which comprises esterifying terephthalic acid with a glycol of the formula:

$$HO(CH_2)_nOH$$

where "$n$" is an integer from 2 to 10 inclusive, in the presence of from about 0.01 to about 5% rutile titanium dioxide as a catalyst and polymerizing the resultant ester to form a high molecular weight polyester.

References Cited in the file of this patent
UNITED STATES PATENTS
2,729,619     Sullivan  ---------------- Mar. 18, 1954